Sept. 15, 1959   W. BEUSSHAUSEN   2,904,271
DEVICE FOR WINDING FLAT ANNULAR BODIES WITH VERY FINE WIRES
Filed March 1, 1956   3 Sheets-Sheet 1
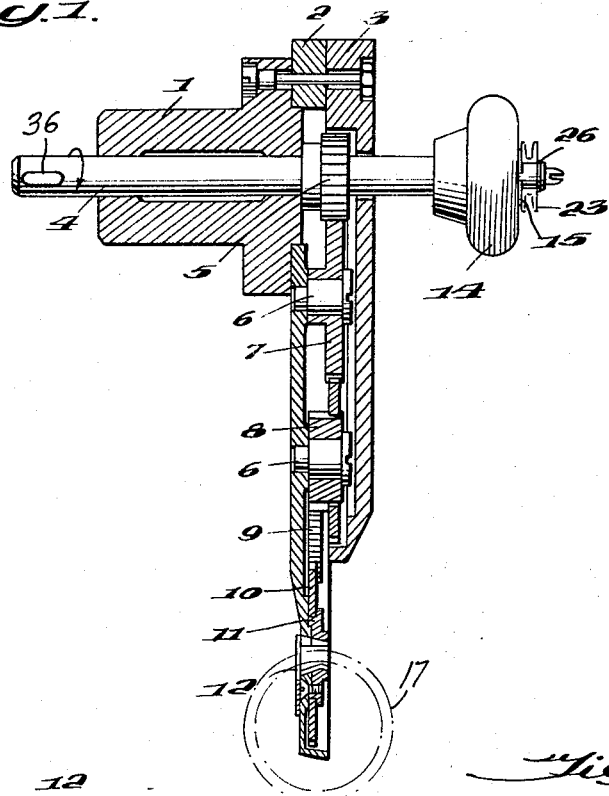
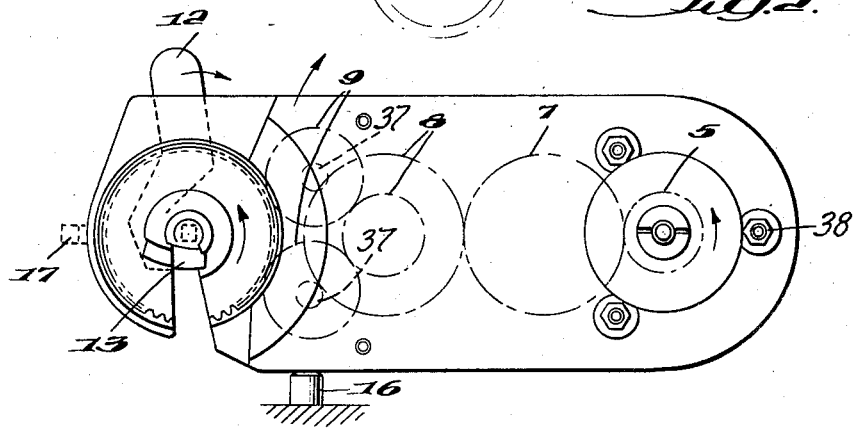

United States Patent Office 2,904,271
Patented Sept. 15, 1959

2,904,271

DEVICE FOR WINDING FLAT ANNULAR BODIES WITH VERY FINE WIRES

Willi Beusshausen, Zurich, Switzerland, assignor to Micafil A.-G., Zurich-Alstetten, Switzerland Application March 1, 1956, Serial No. 568,921

Claims priority, application Switzerland March 8, 1955

3 Claims. (Cl. 242—4)

The present invention relates to winding machines, and is particularly concerned with improvements in mechanisms for winding flat annular bodies with very fine wires.

The winding of annular bodies is effected in this way: A magazine ring extending through the bore of the respective body is first charged with the winding material which is subsequently wound on the wall of the annular body over an overflow device secured to a second annulus. In order to wind a closed annular body, two winding operations are necessary, while open annular bodies can be wound successively with a single magazine charge.

In the case of flat annular bodies with larger bores, however, winding devices are used with a revolving magazine, similar to the round bobbins in sewing machines. With these devices it is possible to wind several closed annular bodies with a single wire supply.

Apart from the production of the wire tension, the guidance of the wires in the above mentioned winding devices is effected by revolving elements. However, the insertion of the bodies into the feeding- and winding-devices, as well as the removal after the winding, requires much time. Besides, there is a possibility that the finished winding might be damaged, which can, in the processing of very fine resistance wires, lead to waste in the secondary operation.

The present invention relates to a device, a so-called winding head, for winding flat annular bodies having large bore diameters. The invention is characterized in that a magazine containing a wire supply is kept in a device secured to a disk revolving about the wall, of the annular body with which the wire is wound on said annular body over a tension equalizer to maintain the adjusted wire tension, independent of the magazine supply, and over a wire guiding device, maintaining the plane of revolution. To facilitate the assembly and disassembly of the winding device, the annular body is pivoted on its clamping point.

An embodiment of the invention is illustrated in the attached drawings, in which:

Fig. 1 shows the winding device in a longitudinal section;

Fig. 2 is a side view seen from the side opposite the drive;

Figure 6:
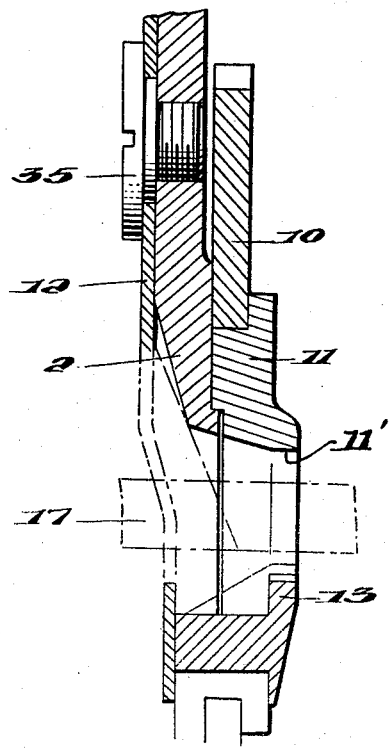

A bearing flange 1, centered in a bearing plate 2, is secured to the latter with several screws. A drive shaft 4 having a gear wheel 5 attached thereto is rotatably mounted in the bearing flange 1, while on the bearing plate 2 are rotatably mounted fixed axles 6, 6 of intermediate gear 7, and stepped wheel 8 as well as the axles 37 of the two intermediate gear wheels 9, 9. Plate 3 has the function of a covering- and reinforcing-plate. In the front part of the bearing plate 2 is arranged a guide member 11 which acts at the same time as a support for a revolving disk 10 which latter meshes with the gear wheels 9. The plate 2, the guide 11 and disk 10 are each provided with a recess or slot for assembling and disassembling an annular body 17, indicated by dot-dashed lines. As shown in Fig. 6, the slot opening in plate 2 coincides with the opening of the guide member 11. By pivotally moving lever 12 to the right as shown by the arrow in Fig. 2, the closure breech 13 will be pivotally removed from the opening to allow insertion or removal of the annular workpiece 17 when the machine is inoperative. The drive shaft 4 may be rotated either by means of the hand knob 14 secured thereto by disk nut 15 or by means of a standard machine drive connected to the projection 36 on the opposite end of shaft 4. Adjacent the hand knob 14 the outer part of the shaft 4 is adapted to receive the empty magazine 23 detachably connected thereto by means of locking spring 26.

Figure 3:
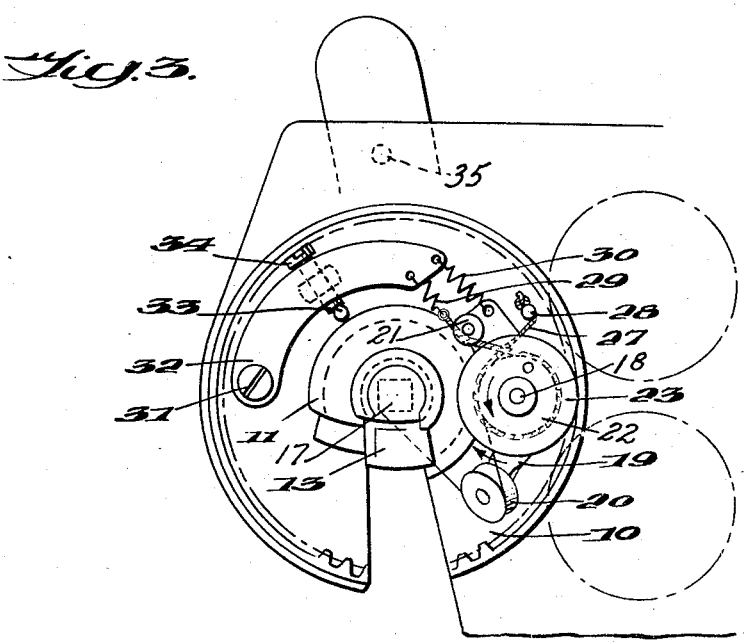
Figs. 3 and 4 show the wire equalizing mechanism, with magazine, in a front-view and in section.
Figure 4:
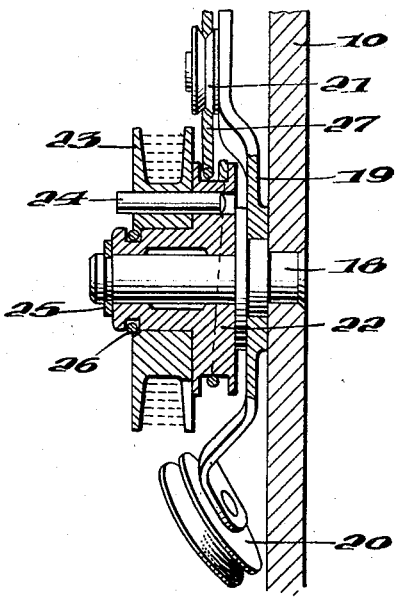
Figure 5:
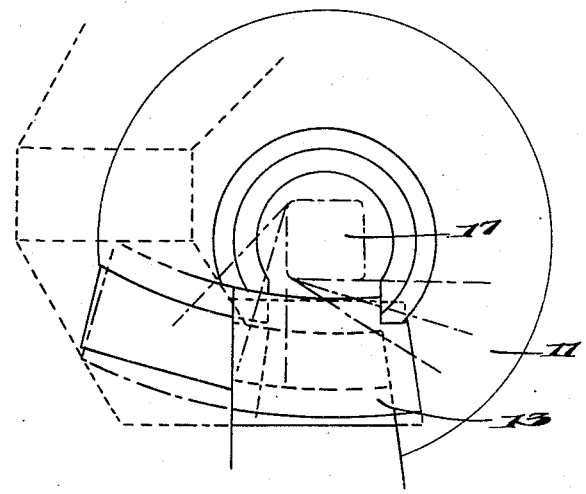
Figs. 5 and 6 illustrate details of the wire guiding device.

Parts of the wire tension-equalizing device, such as an equalizing lever 19 and a brake drum 22, are loosely supported on axle 18 which is riveted to the disk 10, as can be seen from Fig. 4. A locking washer 25 holds the brake drum 22 on the axle 18. The loaded magazine 23 is received and held by the brake drum 22 in the same manner as on the axle 4. While here too an annular spring 26 effects the detachable axial lock, a pin 24 which protrudes into corresponding holes serves to couple the magazine to the brake drum. On one arm of the equalizing lever 19 is arranged, on the part which is bent downward at an angle of about 30°, a runner 20, while a tensioning roller 21 is rotatably mounted on a small axle secured to the other arm of the equalizing lever. A brake wire 27 is secured at one end to pin 28 extending from disk 10 and is partially wound upon brake drum 22 to embrace about five-sixths the periphery thereof. The free end of the brake wire 27 is conducted over the tensioning roller 21 and then is connected to one end of brake spring 29 tensioned by an adjusting lever 32. An equalizing spring 30 is arranged between an adjusting lever 32 and the equalizing lever 19. The two springs have a certain tensional relationship to each other, and can be tensioned more or less by loosening an axle screw 31 and turning an adjusting screw 34, with the adjusting screw always contiguous with pin 33. If the position of the equalizing lever 19 changes due to an increase or decrease in wire tension, the tension of the brake spring will be altered in the opposite sense and thus result in an automatic regulation of the winding wire tension.

The wire-guiding device consists of the guide 11 and a breech 13, which is secured to a lever 12, which in turn is swingable about a bearing screw 35 (Fig. 6). The guide member 11, whose bore passes, after a short cylindrical section 11', conically into the bore of the bearing plate, has a shoulder which is rounded off on the outside. This shoulder is cut off in its entire height at the point where the breech 13 closes the guide. The defined fitting of the breech 13 on the guide 11 is insured by the mutually abutting lever 12 on the corresponding recess of the bearing plate 2. The front face of the breech 13 forms a plane guide ring with that of the guide 11. Recesses are provided both in the disk 10 and in the bearing plate 2 for opening the breech.

To fill the magazine 23, the latter is attached on the receiving pin provided at the end of axle 4 as shown in Fig. 1. One end of the wire to be wound is pulled through the opening provided in the side wall of the magazine and is secured to the slotted axle end. Since there are always several magazines, the charging of the magazines can be effected simultaneously during the winding operation, the charging velocity corresponding to the four-fold winding velocity.

The winding device can be swung counter-clockwise upwardly at its clamping point 38 to the machine (not represented in the drawing) so far to the right that the assembling and disassembling of the annular body, indicated by way of an example, can be effected without any difficulties. The operating position of the winding device, in which the guide 11 with the breech 13 surrounds the respective wall of the annular body in equal distances, is set by shifting the clamping point and adjusting a stop 16 fixed on the machine. With equal annular bodies, the winding device thus always arrives in the same operating position. The loaded magazine is then placed on axle 18 as shown in Fig. 4. While the device is swung upward, the free end of the wire is pulled through the open guide 11 from the loaded magazine 23 over the runner 20, and fixed at the rear side of the bearing plate 2. No additional threading is necessary.

The wire tension-equalizing device effects—during the winding operation—both the braking of the brake drum 22 with the magazine 23 and the maintenance of the wire tension within the admissible limits, independently of the respective magazine supply. If the moment produced by the wire tension predominates, the equalizing lever 19 will be pivoted in the clockwise direction, which movement results in a smaller braking force corresponding to the relaxation of the brake spring 29. If, however, a smaller braking force appears with a maximum magazine supply, the moment produced by the equalizing spring 30 exceeds the moment produced on the equalizing lever 19 by the effect of the wire tension on the runner 20; thus, the equalizing lever is rotated in the counter-clockwise direction which in turn exerts a greater stress on the brake spring 29 and thus also a greater braking force on the brake drum 22 and the magazine 23.

As a result of the inclined position of the runner 20, the wire leaves the latter in a plane which lies below the plane of the guide 11 and the breech 13, and is thus necessarily conducted over the latter. The breech 13 is so arranged with regard to the guide 11, that the passing wire, as it is indicated by dot-dashed lines, glides without interruption of the guide plane from one guiding surface to the other, as in a closed ring. The guiding plane of the wire guiding device intersects as mid-vertical the horizontal front faces of the annular body.

I claim:

1. Apparatus for winding fine wire upon an annular body having a large bore diameter comprising a frame, a disk rotatably mounted in said frame, said disk having a radial slot extending to the center thereof adapted to receive a segment of said annular body, a magazine of wire rotatably mounted on said disk, a brake drum connected to said magazine, flexible braking element means cooperating with said brake drum to retard the rotation of said magazine, a lever pivotally connected intermediate its ends to said disk, a runner connected to one end of said lever, the wire being guided from said magazine by said runner to said annular body, a tensioning roller connected to the other end of said lever and in contiguous engagement with said flexible braking element means, means pivotally biasing said lever in a direction to cause said runner to tension said wire and said tensioning roller to tension said flexible braking element means, and means for rotating said disk to wind wire upon said annular body, whereby upon the increase of tension in said wire upon said runner said lever will pivot in a direction to displace the tensioning roller to reduce the tensioning of said flexible brake element means.

2. In an apparatus for winding fine wire upon an annular body having a large bore diameter, said apparatus including a frame, a disk rotatably mounted in said frame, a magazine of wire rotatably mounted on said disk, said disk having a radial slot extending to the center thereof adapted to receive a segment of said annular body, means for rotating said disk about said annular body segment to wind wire from said magazine thereon, means for guiding said wire as it is being wound on said annular body, and means for tensioning said wire during winding of said annular body; the improvement wherein said wire guiding means and said wire tensioning means comprises a brake drum connected to and coaxially arranged with respect to said magazine, a lever pivotally connected intermediate its ends to said disk about a pivot axis coaxially arranged with respect to the magazine axis, a runner secured to a first end of said lever, the wire from said magazine being guided by said runner to said annular body, equalizer spring means pivotally biasing said lever in a first direction to tension the wire guided by said runner, a flexible brake element partially wound about the periphery of said brake drum, one end of said brake element being connected to said disk, a brake spring connected at a first end to said disk and at the other end to the other end of said brake element, and a tensioning roller connected to the other end of said lever in contiguous engagement with said flexible brake element, said tensioning roller increasing the tension in said brake element upon pivotal movement of said lever in said first direction by said equalizer spring means, said lever being pivoted in the opposite direction upon the increase of tension in said wire to displace said tensioning roller in a direction to reduce the tension in said flexible braking element.

3. Apparaus as defined in claim 2 and further including an adjusting lever pivotally connected at one end to said disk, the first end of said brake spring and one end of said equalizer spring means being connected to the free end of said adjusting lever, and adjusting screw means for adjusting the position of said adjusting lever to vary the tensions of said brake spring and said equalizer spring means.

References Cited in the file of this patent

UNITED STATES PATENTS

| | | |
|---|---|---|
| 344,273 | Heer | June 22, 1886 |
| 2,437,309 | Veatch | Mar. 9, 1948 |